3,083,228
METHOD FOR THE PREPARATION OF ALKYLDIHALOBORANES
George W. Willcockson, Anaheim, Calif., assignor to United States Borax & Chemical Corporation, Los Angeles, Calif., a corporation of Nevada
No Drawing. Filed Oct. 13, 1960, Ser. No. 62,319
7 Claims. (Cl. 260—543)

The present invention relates as indicated to a method for the preparation of alkyldihaloboranes.

Various methods for the preparation of dihaloalkylboranes are known to those skilled in the art. Such prior methods involve the reaction of boron chloride with a trialkylborane, trialkylboroxine or an organo-metal reagent derived from an alkali metal:

$$R_3B + 2BCl_3 \rightarrow 3RBCl_2$$
$$(RBO)_3 + 2BCl_3 \rightarrow 3RBCl_2$$
$$RM + BCl_3 \rightarrow RBCl_2 + MCl$$

Each of these foregoing methods suffers from one or more of the following disadvantages: (1) low yields, (2) multi-stage process, (3) expensive reactants, and (4) impure products.

It is, therefore, the principal object of the present invention to provide an improved process for the preparation of alkyldihaloboranes in substantially quantitative yields and substantially pure form.

Other objects of the invention will appear as the description proceeds.

To the accomplishment of the foregoing and related ends, said invention then comprises the features hereinafter fully described and pointed out in the claims, the following description setting forth in detail certain illustrative embodiments of the invention, these being indicative, however, of but a few of the various ways in which the principle of the invention may be employed.

Broadly stated, the present invention comprises the method for preparing alkyldihaloboranes which comprises the reaction of a trialkylaluminum with a boron trihalide in an inert hydrocarbon solvent according to the equation $$R_3Al + 3BX_3 \rightarrow 3RBX_2 + AlX_3$$

and recovering substantially pure alkyldihaloborane from the reaction mass where $R_3Al$ is a trialkylaluminum, R is a material selected from the group consisting of saturated primary straight chain and branched chain alkyl groups and saturated secondary straight chain and branched chain alkyl groups and X is halogen.

The size of the straight or branched chain saturated alkyl group is immaterial to the present invention. In the preferred embodiment of my invention I use trialkylaluminums having alkyl groups containing from 1 to 4 carbon atoms. The use of the preferred trialkylaluminums is dictated by economy and availability, and it is again emphasized that the size of the alkyl group is immaterial to the present invention. Thus, trimethylaluminum or trioctylaluminum or trialkylaluminums having even larger alkyl groups can be used in the present invention.

The following list is illustrative of the trialkylaluminum compounds which are applicable to the present invention:

Trimethylaluminum
Triethylaluminum
Triisopropylaluminum
Triisobutylaluminum
Trioctylaluminum
Tridodecylaluminum
Tristearylaluminum As for the boron trihalide compounds, boron trichloride, boron tribromide, boron triiodide and boron trifluoride are all applicable to the present invention. Boron trichloride is preferred since it is the cheapest and most readily available.

The solvents applicable to the present invention are hydrocarbons or halogenated hydrocarbons which are inert to both boron trihalides and aluminum trihalides. Such well known solvents as benzene, mineral oil, toluene, xylene and halogenated benzene derivatives such as chlorobenzene, bromobenzene, chlorotoluene and 2-bromo-p-xylene are equally applicable to the present invention. For ease of separation, the solvent used should have a different boiling point than that of the final reaction products.

The compounds produced by the present reaction have been demonstrated to be useful as polymerization catalysts for common vinyl-type monomers. They are also active chemical intermediates and can be used for the production of a wide variety of organoboron compounds such as alkyldialkoxyboranes, trialkyl boranes, alkylaminohaloboranes, alkyl(dialkylamino)boranes, and boroazoles.

So that the present invention can be more clearly understood, the following examples are given for illustrative purposes:

I

Triethylaluminum, 51.9 grams (0.455 mole) was added slowly over a ten-minute period to a solution containing 222.3 grams (1.59 mole) of boron trichloride in 450 ml. of chlorobenzene at −70° C. The mixture was allowed to warm slowly with good stirring. Between 0° C. and 10° C. a solid began to separate and heat was evolved. A cooling bath was used to maintain a temperature below 20° C. until the exothermic reaction had subsided. The reaction mass was allowed to warm to room temperature and stirring was continued for about 2 hours. The reaction mixture was distilled through a vacuum jacketed, glass packed column and 146 grams (97% yield) of ethyldichloroborane, B.P. 50–52° C., was recovered. Chemical analysis yielded the following data.

Calculated for $C_2H_5BCl_2$:
Percent B _____ 9.76
Percent C _____ 21.66
Percent Cl _____ 64.07

Found in product:
Percent B _____ 9.72
Percent C _____ 21.74
Percent Cl _____ 64.00

II

Trimethylaluminum, 36 grams (0.5 mole), was added slowly over a ten-minute period to a solution containing 240 grams (1.5 mole) of boron tribromide in 450 ml. of bromobenzene at −70° C. The mixture was allowed to warm slowly with good stirring. A work-up of the reaction mixture as described in Example I above resulted in 271 grams (97.5% yield) of methyldibromoborane, B.P. 58–60° C. Chemical analysis yielded the following data.

Calculated for $CH_3BBr_2$:
Percent B _____ 5.83
Percent C _____ 6.46
Percent Br _____ 86.09

Found in product:
Percent B _____ 5.80
Percent C _____ 6.53
Percent Br _____ 85.93

III

Triisobutylaluminum, 99.1 grams (0.5 mole) was added slowly over a ten-minute period to a solution containing 117.3 grams (1.5 moles) of boron trichloride in 450 ml. of chlorobenzene at −50° C. The mixture was allowed to warm slowly with good stirring. The reaction mixture was then treated as in Example I and resulted in 198 grams (95.1% yield) of isobutyldichloroborane, B.P. 95–98° C. Chemical analysis yielded the following data.

Calculated for $C_3H_7BCl_2$:

| | |
|---|---|
| Percent B | 8.67 |
| Percent C | 28.84 |
| Percent Cl | 56.88 |

Found in product:

| | |
|---|---|
| Percent B | 8.62 |
| Percent C | 28.96 |
| Percent Cl | 56.74 |

The above examples and similar examples were performed using boron trifluoride and boron triiodide with comparable results.

The predicted results from the reaction of a trialkylaluminum and a boron trihalide would be a mixture of products and the yield of alkyldihaloboranes would be less than 50%. However, as clearly demonstrated by the foregoing discussion and examples, the present process results in substantially quantitative yields of substantially pure product. We do not fully understand why the present process deviates from predicted results; however, regardless of the theory involved, the fact remains that the totally unexpected results of substantially quantitative yields of substantially pure alkyldihaloboranes are obtained by following the present teachings.

Other modes of applying the principle of the invention may be employed provided the feature stated in any of the claims or the equivalent of such be employed.

I, therefore, particularly point out and distinctly claim as my invention:

1. The method for preparing alkyldihaloboranes according to the equation $$R_3Al + 3BX_3 \rightarrow 3RBX_2 + AlX_3$$

which comprises reacting a trialkylaluminum with a boron trihalide in an inert hydrocarbon solvent at a temperature below 0° C., allowing the reaction mass to warm slowly to a temperature of no higher than about 20° C. with constant agitation and recovering substantially pure alkyldihaloborane from the reaction mass, where $R_3Al$ is a trialkylaluminum, R is selected from the group consisting of primary and secondary alkyl radicals of from 1 to 12 carbon atoms, and X is halogen.

2. The method for preparing alkyldihaloboranes according to the equation $$R_3Al + 3BX_3 \rightarrow 3RBX_2 + AlX_3$$

which comprises adding a trialkylaluminum to a solution of a boron halide in an inert hydrocarbon solvent at a temperature of from about −80° C. to about −50° C., allowing the mixture to warm slowly to a temperature of from about 0° C. to about 20° C. with constant agitation, and recovering substantially pure alkyldihaloborane from the reaction mass, where $R_3Al$ is a trialkylaluminum, R is a material selected from the group consisting of primary and secondary alkyl radicals of from 1 to 12 carbon atoms, and X is halogen.

3. The method of claim 2 where R is a material selected from the group consisting of saturated primary straight chain and branched chain alkyl groups having from 1 to 4 carbon atoms, and saturated secondary alkyl groups having from 3 to 4 carbon atoms.

4. The method of claim 3 where said halogen is chlorine.

5. The method for preparing ethyldichloroborane which comprises adding triethylaluminum to a solution of boron trichloride in chlorobenzene at a temperature of about −70° C., allowing the mixture to warm slowly to about 20° C. with constant agitation, and recovering substantially pure ethyldichloroborane from said reaction mass.

6. The method for preparing methyldibromoborane which comprises adding trimethylaluminum to a solution of boron tribromide in bromobenzene at a temperature of about −70° C., allowing the mixture to warm slowly to about 20° C. with constant agitation, and recovering substantially pure methyldibromoborane from said reaction mass.

7. The method for preparing isobutyldichloroborane which comprises adding triisobutylaluminum to a solution containing boron trichloride in chlorobenzene at a temperature of about −50° C., allowing the mixture to warm slowly to about 20° C. with constant agitation, and recovering substantially pure isobutyldichloroborane from said reaction mass.

References Cited in the file of this patent

UNITED STATES PATENTS 2,900,414     Muetterties     Aug. 18, 1959

OTHER REFERENCES

Koster: Angew. Chemical, vol. 70, pages 371–372 (1958).